(12) United States Patent
Khazanchi et al.

(10) Patent No.: US 9,880,837 B2
(45) Date of Patent: Jan. 30, 2018

(54) ARTIFACT MANAGER FOR RELEASE AUTOMATION

(71) Applicant: VMWARE, INC., Palo Alto, CA (US)

(72) Inventors: Rajesh Khazanchi, Palo Alto, CA (US); Rakesh Sinha, Palo Alto, CA (US); Servesh Singh, Bangalore (IN); Danny Holzman, Palo Alto, CA (US); Assaf Berg, Palo Alto, CA (US); Devaki Kulkarni, Palo Alto, CA (US); Nilesh Agrawal, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/000,061

(22) Filed: Jan. 19, 2016

(65) Prior Publication Data

US 2016/0378449 A1    Dec. 29, 2016

(30) Foreign Application Priority Data

Jun. 24, 2015  (IN) .......................... 3168/CHE/2015

(51) Int. Cl.
*G06F 9/44* (2006.01)
*G06F 9/445* (2006.01)
*G06F 9/455* (2006.01)
*G06F 9/50* (2006.01)

(52) U.S. Cl.
CPC ............ *G06F 8/71* (2013.01); *G06F 9/45558* (2013.01); *G06F 9/5077* (2013.01); *G06F 2009/4557* (2013.01)

(58) Field of Classification Search
None
See application file for complete search history.

(56) References Cited

U.S. PATENT DOCUMENTS

2015/0089377 A1* 3/2015 Dasgupta .......... G06F 17/30899
715/738

* cited by examiner

*Primary Examiner* — Chuck Kendall (57) ABSTRACT

An artifact manager generates an abstraction for artifacts and repositories in a deployment platform such that the artifacts may be located uniformly and securely in each deployment environment during the deployment process. The described system includes a release automation platform having a release pipeline which is responsible for deploying build artifacts into multiple deployment environments, testing the build artifacts thoroughly in each environment, and follow organization-specific approval processes to promote the build artifacts to a next deployment environment.

17 Claims, 4 Drawing Sheets

ARTIFACT MANAGER FOR RELEASE AUTOMATION

RELATED APPLICATIONS

Benefit is claimed under 35 U.S.C. 119(a)-(d) to Foreign application Serial No. 3168/CHE/2015 filed in India entitled "ARTIFACT MANAGER FOR RELEASE AUTOMATION", on Jun. 24, 2015, by VMware, Inc., which is herein incorporated in its entirety by reference for all purposes.

BACKGROUND

In today's agile and competitive technology fields, organizations often seek to speed up the development of software applications and products and launch these products into the market in the shortest time. Application release automation, which is a process of packaging and deploying an application or an update of an application from development to production, has arisen to meet the demands of managing an application's life cycle. However, conventional deployment approaches suffer from a variety of problems. For example, development of different applications can generate different types of build artifacts. Such artifacts can be stored in various repositories or artifact stores. As such, managing artifacts during an application's life cycle can be a major challenge in release automation. Further, repository in one deployment environment might not be easily accessed by another deployment environment due to security restrictions. These issues have an impact on deployment as well because a conventional application blueprint that specifies artifact dependencies of the application might not be aware about each of the repositories and artifacts stored in the repositories.

SUMMARY

Embodiments of the present disclosure provide a method, non-transitory computer-readable storage medium, and a computing system. The method includes receiving a request to deploy an application defined by an application blueprint in a first deployment environment. The application blueprint specifies a logical artifact name of at least one artifact that is part of the application. The method further includes determining a resource location of the at least one artifact that is part of the application according to the application blueprint and to a mapping of logical artifact names to resource locations of repositories associated with the first deployment environment. The method includes deploying a first build of the application in the first deployment environment from the determined resource location of the at least one artifact.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
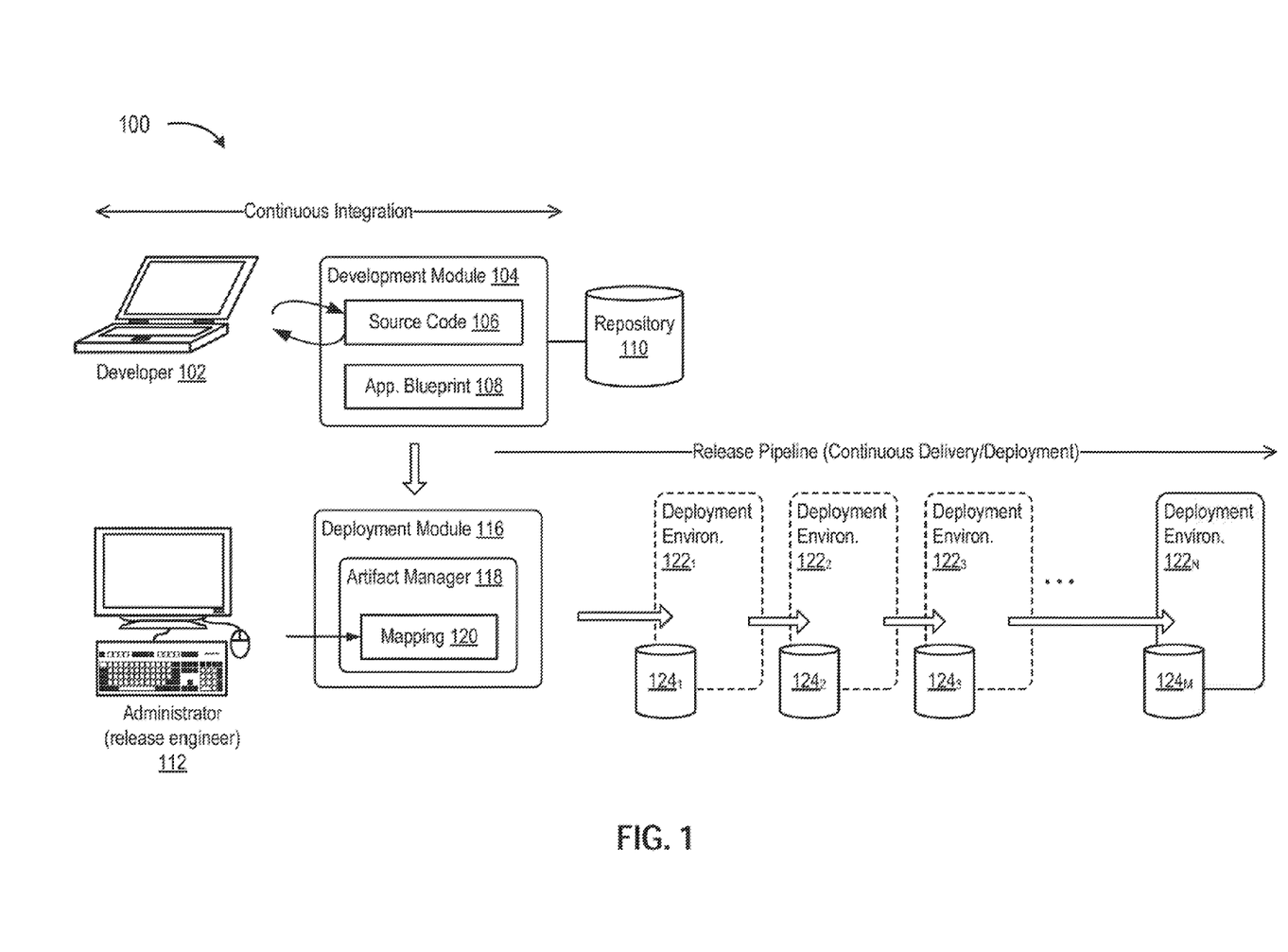
FIG. 1 depicts a block diagram of a computing system for developing and deploying software releases, in which one or more embodiments of the present disclosure may be practiced.

FIG. 1 depicts a block diagram of a computing system 100 for developing and deploying software releases, in which one or more embodiments of the present disclosure may be practiced. As shown, one or more developers 102 writes and edits source code 106 of an application using an development module 104, which can be an integrated development environment (IDE) or other software development tool. Under a software engineering practice referred to as continuous integration, developer 102 frequently merges, or "integrates", their working copy of source code 106 with a central copy (i.e., trunk, mainline, baseline) shared with other developers and stored in a central source code repository 110.

In today's agile and competitive technology fields, organizations often seek to speed up the development of software applications and products and launch these products into the market in the shortest time. Application release automation, which is a process of packaging and deploying an application or an update of an application from development to production, has arisen to meet the demands of managing an application's life cycle.

Computing system 100 includes a deployment module 112 configured to build and deploy an application or an update to an application from source code 104 (e.g., from code repository 110) and/or one or more artifacts to a series of deployment environments. Deployment module 112 may be a release automation platform having a release pipeline which is configured to deploy build artifacts into multiple deployment environments, and test the build artifacts thoroughly in each environment, until the application has been deployed to a production environment. In the embodiment shown in FIG. 1, computing system 100 includes a plurality of deployment environments $122_1$ to $122_N$ (referred to collectively as deployment environments 122) representing stages in a release pipeline. That is, deployment module 112 deploys an application to a first deployment environment $122_1$ for testing, then upon approval deploys another instance of the application to a next deployment environment $122_2$ for other testing, and so forth, until reaching a final deployment environment $122_N$ (i.e., production environment).

As by-products of software development, "artifacts" are generally known as modular components used to build applications and may be relied upon by applications. Artifacts may include binary code compiled from source code 106 representing executable binaries, code libraries, and other types of packaged software code, or in some cases, may be a version of source code 106 itself. An artifact is typically embodied as a computer file, and may be encoded in a variety of formats, such as a RPM Package Manager (RPM), zip, Java Archive (JAR) file, a Web Application Archive (WAR), Enterprise Archive (EAR) file or other file formats.

However, development of different applications generates different types of artifacts. Further, artifacts can be stored in various repositories or artifact stores, such as the Yum package-management utility, Maven artifact repository, Advanced Package Tool (APT), or other artifact management repositories. In the embodiment shown in FIG. 1, each deployment environment 122 may have a corresponding different repository 124 (i.e., $124_1$ to $124_M$) from which to retrieve build artifacts. As such, managing artifacts during an application's life cycle can be a major challenge in release automation. Further, repository in one deployment environment (e.g., repository $124_1$) might not be easily accessed by another deployment environment (e.g., environment $122_3$) due to security restrictions. These issues have an impact on deployment as well because a conventional application blueprint that specifies artifact dependencies of the application might not be aware about each of the repositories and artifacts stored in the repositories.

Accordingly, embodiments of the present disclosure provide an abstraction for all artifacts and repositories such that the artifacts may be located uniformly and securely in each deployment environment during the deployment process. Embodiments of the present disclosure include a release automation platform having a release pipeline which is responsible for deploying build artifacts into multiple deployment environments, testing the build artifacts thoroughly in each environment, and follow organization-specific approval processes to promote the build artifacts to a next deployment environment.

According to one or more embodiments, deployment module 116 includes an artifact manager 118 configured to abstract different types of repositories. Artifact manager 118 is configured to generate and maintain, in response to user input from a system administrator 112 (e.g., in the role of a release engineer), an artifact mapping 120 that maps logical artifact names to actual physical paths of artifacts stored in repositories 124 associated with each different development environment. In turn, in addition to writing source code 106 for an application, developer 102 creates an application blueprint 108 for the application which identifies which of source code 106 make up the application and that specifies how particular components of code are inter-related or dependent upon other code components i.e., dependencies). Application blueprint 108 uses the logical artifact names that have been defined in mapping 120 to specify which artifacts are part of the application.

Figure 2:
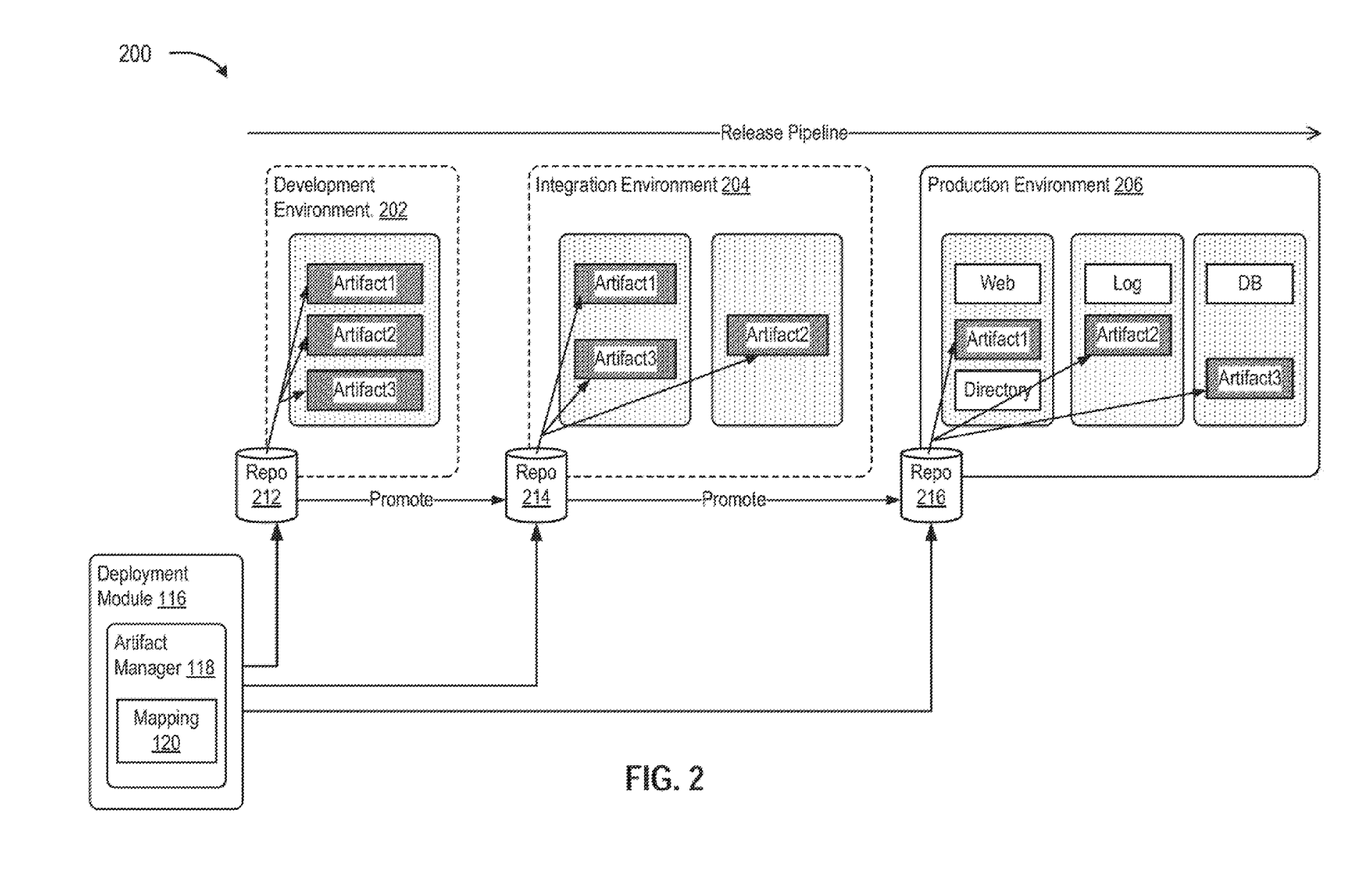
FIG. 2 is a block diagram depicting an example release pipeline where artifacts can be deployed, according to embodiments of the present disclosure.

FIG. 2 is a block diagram depicting an example release pipeline 200 comprised of a plurality of deployment environments, specifically, development environment 202, an integration environment 204, and a production environment 206, where artifacts should be deployed. Each deployment environment may be comprised of host computer and/or virtual machines (not shown) allocated for the deployment of an application. Components of the application may be installed on a single host and/or virtual machine, or distributed across multiple hosts and/or virtual machines in a multi-tier configuration. While FIG. 2 depicts a specific series of environment types, various other types of deployment environments having different functional purposes may be utilized. For example, other examples of release pipeline stages include a test environment, a user acceptance test (UAT) environment, a system integration test environment, a load test environment, a pre-production environment, and a staging environment.

At a first stage of the release pipeline, deployment module 116 deploys an instance of a target application having an associated application blueprint 108 into development environment 202 for testing purposes, for example, to test a developer's working copy having code changes, bug fixes, and/or feature additions. In this example, application blueprint 108 for the application specifies that the application depends on three different artifacts, labeled in FIG. 2 as Artifact1, Artifact2, and Artifact3. Artifact manager 118 is configured to resolve the logical artifact names contained in application blueprint 108 to physical paths to a first repository 212 associated with that development environment 202 (or to other repositories). Artifact manager 118 is configured to access first repository 212 of development environment 202 to retrieve Artifact1, Artifact2, and Artifact3, as depicted in FIG. 2. The instance of the application in development environment 202 may be tested by automated test suites or manual operators, according to business and technical use cases defined by a program manager or application architect. Upon approval, the artifacts in repository 212 can be promoted to a repository 214 associated with the next deployment environment, namely, integration environment 204.

Artifacts that have been deployed and verified in one environment may be promoted to another environment. Promotion of the physical artifacts can be achieved in a variety of ways. In some embodiments, artifacts may be promoted by moving the artifacts to another directory in a same repository server. In other embodiments, artifacts are promoted by moving the artifacts from one repository server to another, which may utilize one or more scripts and/or manual copying procedures. In another embodiment, artifacts are promoted by tagging artifacts with a classification that the artifact has been promoted a particular stage. In this approach, artifacts across stages can be maintained in the same repository, with metadata being used to differentiate between levels of promotion.

At the next stage of release pipeline 200, deployment module 116 deploys copies of the artifacts (Artifact1, Artifact2, Artifact3) from a second repository 214 into integration environment 204 to create another instance of the application. Testing is again performed in integration environment 204, but with different sets of tests and approval processes. When this instance has passed integration-related tests, the artifacts of repository 214 may be promoted to a next repository 216 associated with production environment 206. It is noted that the same application blueprint 108 used for the first stage of release pipeline 200 may be re-used for deploying the application to this second stage of release pipeline 200 because application blueprint 108 uses logical artifact names. The details of where and how to retrieve artifacts for a particular deployment environment (e.g., integration environment 204) is encoded within mapping 120 and handled by artifact manager 118.

Finally, in the example shown in FIG. 2, deployment module 116 deploys copies of the artifacts Artifact1, Artifact2, Artifact3, from a third different repository 216 associated with production environment 206 to create a production instance of the application in production environment 206. It should be understood that embodiments do not necessarily have a one-to-one correspondence of repository to deployment environment, and that alternative configurations may be used, i.e., multiple deployment environments sharing a repository. As illustrated in FIG. 2, embodiments of the present disclosure enable a developer to rapidly develop and push a version of an application to production, thereby reducing development costs of and improving the quality of software.

Figure 3:
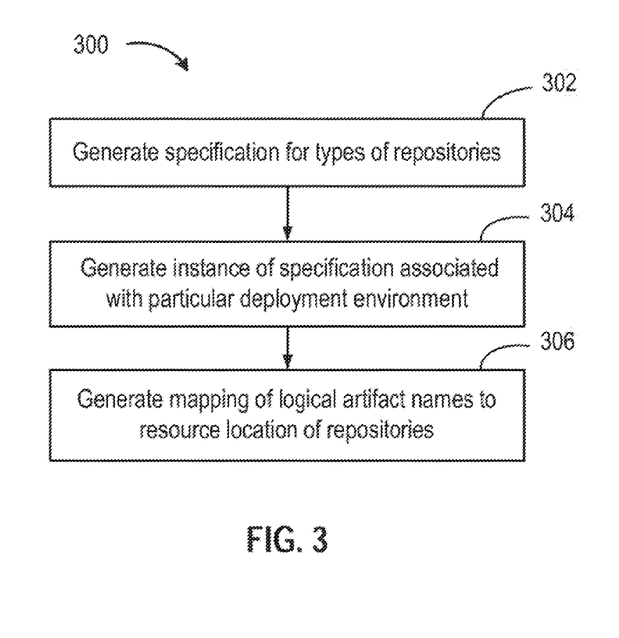
FIG. 3 is a flow diagram depicting a method 300 for setting up an artifact mapping for a release pipeline, according to one embodiment of the present disclosure.

FIG. 3 is a flow diagram depicting a method 300 for setting up an artifact mapping for a release pipeline, according to one embodiment of the present disclosure. While embodiments of the present disclosure are described in terms of the systems described in FIG. 1, it should be recognized that other systems may be utilized to perform the described method.

Method 300 begins at step 302, where artifact manager 118 generates (e.g., in response to user input from administrator 112) a specification for a first type of repository configured to store artifacts. The specification may include a number of metadata fields that describe parameters for a type of repository. In some embodiments, the specification includes a first field that defines a version parameter for the type of repository. Through the specification, an administrator may define what "version" as a concept means to a particular type of repository. For example, a specification for one repository may specify that the version concept is represented by a "build number" parameter, while a specification for a different repository specifies that the version concept is represented by a "Job ID" parameter, and yet another type of repository might simply use a "version" parameter. In some embodiments, the specification includes a second field indicating how the type of repository is accessed. That is, an administrator may define the parameters needed to access that type of repository. For example, a specification for one repository may specify that connection parameters for a host or network address for the repository and for credentials for the repository. In some embodiments, the specification includes a third field indicating an action parameter used to access the first type of repository. In one implementation, the value of the action parameter may be scripting code (or path to a script) that uses the parameter values of the first and second fields to access that type of repository and download and deploy an artifact from that repository.

At step 304, artifact manager 118 generates (e.g., in response to user input) an instance of the specification associated with a first deployment environment having the first type of repository, the first deployment environment being associated with a stage within a release pipeline. For example, administrator 112 specifies that artifacts for development environment 202 are retrieved from a Maven repository, and defines an instance of a Maven repository type according to a Maven specification as being associated with development environment 202. Similarly, administrator 112 may specify that artifacts for integration environment 204 (associated with the integration stage of the release pipeline) are retrieved from an associated Github repository, and generate an instance of a Github repository type according to a Github specification (generated in step 302).

At step 306, artifact manager 118 generates a mapping 120 of logical artifact names to resource locations of repositories. Mapping 120 may include a listing of artifacts stored and available in the various repositories, including a logical name for an artifact and one or more corresponding physical paths to a copy of that artifact in various repositories. An example mapping is depicted in FIG. 4.

Figure 4:
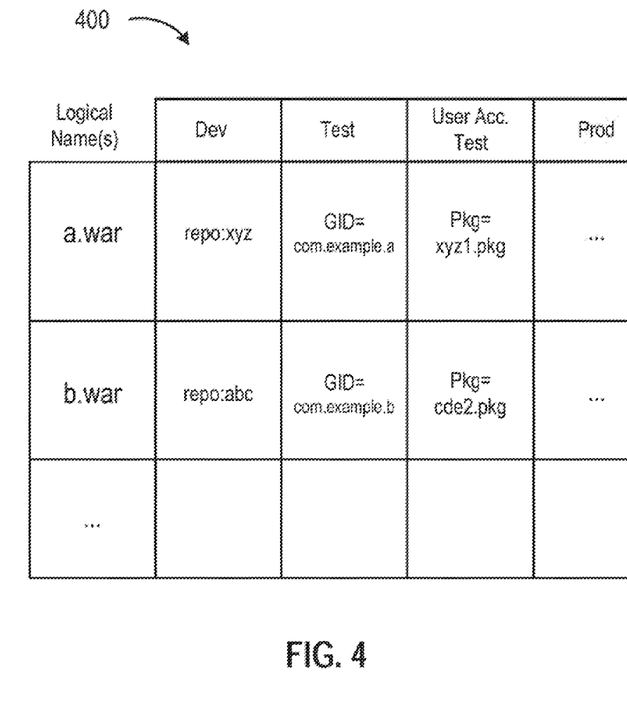
FIG. 4 is a tabular diagram depicting an example mapping of logical artifact names and resource locations, according to an embodiment of the present disclosure.

FIG. 4 is a tabular diagram depicting an example mapping 400 of logical artifact names and resource locations, according to an embodiment of the present disclosure. Mapping 400 includes a plurality of logical artifact names 402 (e.g., "a.war" and "b.ear") and a plurality of corresponding resource locations for associated deployment environments. As described above, an application blueprint 108 references an artifact using its logical artifact name (e.g., "a.war") rather than a physical file path to a specific repository. In mapping 400 shown in FIG. 4, columns 404, 406, and 408 represent deployment environments (e.g., "Development" or "DEV", "TEST", and "Production" or "PROD") in which an artifact is available.

A resource location associated with each deployment environment is contained within entries of mapping 400. The resource location may encode information defined by a specification on how to access and retrieve information from the particular type of repository of a deployment environment. For example, mapping 400 indicates that the artifact identified by the logical artifact name "a.war" can be obtained from a repository when deploying to the DEV environment 402 using the resource location "repo:xyz". This resource location includes the version parameter "build_number" as might have been defined by the specification for the DEV environment. In another example, mapping 400 indicates that the artifact identified by that same logical artifact name "a.war" can be obtained from a different repository when deploying to the TEST environment 404 using the resource location "GID=com.example.a". As depicted, the actual physical path and location information of the different repositories has been abstracted into a logical artifact name, which enables the continuous delivery and deployment of an application. Once a mapping of logical artifact names to resource locations for different deployment environments has been set up (e.g., via user input from an administrator or release engineer), an application or an update to an application can be rapidly deployed using the mapping.

Figure 5:
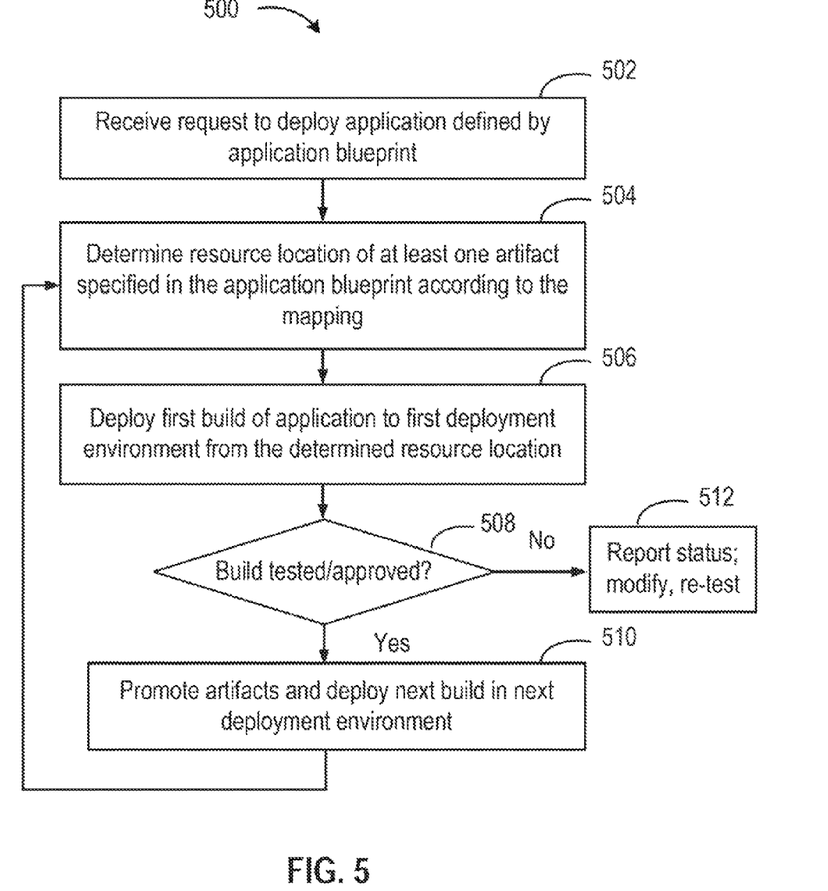
FIG. 5 is a flow diagram depicting a method for deploying an application, according to one embodiment of the present disclosure.

FIG. 5 is a flow diagram depicting a method 500 for deploying an application, according to one embodiment of the present disclosure. While embodiments of the present disclosure are described in terms of the systems described in FIG. 1, it should be recognized that other systems may be utilized to perform the described method.

Method 500 begins at step 502, where deployment module 112 receives a request to deploy an application defined by an application blueprint in a first deployment environment. The application blueprint specifies a logical artifact name of at least one artifact that is part of the application.

At step 504, artifact manager 114 of deployment module 112 determines a resource location of the at least one artifact that is part of the application according to the application blueprint and to a mapping of logical artifact names to resource locations of repositories associated with the first deployment environment.

At step 506, deployment module 112 deploys a first build of the application in the first deployment environment from the determined resource location of the at least one artifact. In some embodiments, the first deployment environment is part of a series of deployment environments representing a release pipeline include at least a test environment and a production environment.

At step 508, deployment module 112 determines whether the first build of the application in the first deployment environment passes one or more testing processes or otherwise receives approval in that stage of the release pipeline. If so, at step 510, deployment module 112 may promote the artifacts in the first repository to the next repository, and deploy a next build in the next deployment environment. Otherwise, at step 512, deployment module 112 reports the status results to the user invoking the deployment (e.g., developer 102), and permits the user an opportunity to modify the application or deployment, and re-deploy the modification and re-test.

In one or more embodiments, responsive to determining that the first build of the application in the first deployment environment has passed testing, deployment module 112 may iterate and deploy a second build of the application in a second deployment environment associated with a next stage within a release pipeline. In some embodiments, as part of that subsequent iteration, deployment module 112 may determine a second resource location of the at least one artifact that is part of the application according to the same application blueprint and to the mapping of logical artifact names to resource locations of repositories associated with the second deployment environment. Deployment module 112 may deploy the second build of the application in the second environment from the determined second resource location of the least one artifact.

In some embodiments, the first build of the application may be deployed from a first repository of a first repository type, the first repository being associated with the first deployment environment; while the second build of the application is deployed from a second repository of a second repository type associated with the second deployment environment.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. As used herein, the term "container" refers generically to both virtual machines and OS-less containers.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method comprising:
receiving a request to deploy an application defined by an application blueprint in a first deployment environment, wherein the application blueprint specifies a logical artifact name of at least one artifact that is part of the application;
determining a resource location of the at least one artifact that is part of the application according to the application blueprint and to a mapping of logical artifact names to resource locations of repositories associated with the first deployment environment;
deploying a first build of the application in the first deployment environment from the determined resource location of the at least one artifact; and
responsive to determining the first build of the application in the first deployment environment has passed testing, promoting the at least one artifact to a second deployment environment and deploying a second build of the application in the second deployment environment associated with a next stage within a release pipeline.

2. The method of claim 1, further comprising:
determining a second resource location of the at least one artifact that is part of the application according to the same application blueprint and to the mapping of logical artifact names to resource locations of repositories associated with the second deployment environment; and
deploying the second build of the application in the second environment from the determined second resource location of the least one artifact.

3. The method of claim 1, wherein the first build of the application is deployed from a first repository of a first repository type, the first repository associated with the first deployment environment; and wherein the second build of the application is deployed from a second repository of a second repository type associated with the second deployment environment.

4. The method of claim 1, wherein the mapping of logical artifact names to resource locations of repositories is generated according to a process comprising:
generating a specification for a first type of repository configured to store artifacts; and
generating an instance of the specification associated with the first deployment environment having the first type of repository, wherein the first deployment environment is associated with a stage within a release pipeline.

5. The method of claim 4, wherein the specification comprises a first field indicating a type of version, a second field indicating how the first type of repository is accessed, and a third field indicating an action parameter used to access the first type of repository.

6. The method of claim 1, wherein the first deployment environment is part of a series of deployment environments representing a release pipeline comprising at least a test environment and a production environment.

7. A non-transitory computer-readable storage medium comprising instructions that, when executed in a computing device, operate a computing system, by performing the steps of:
receiving a request to deploy an application defined by an application blueprint in a first deployment environment, wherein the application blueprint specifies a logical artifact name of at least one artifact that is part of the application;
determining a resource location of the at least one artifact that is part of the application according to the application blueprint and to a mapping of logical artifact names to resource locations of repositories associated with the first deployment environment;
deploying a first build of the application in the first deployment environment from the determined resource location of the at least one artifact; and
responsive to determining the first build of the application in the first deployment environment has passed testing, promoting the at least one artifact to a second deployment environment and deploying a second build of the application in the second deployment environment associated with a next stage within a release pipeline.

8. The non-transitory computer-readable storage medium of claim 7, wherein the steps further comprise:
determining a second resource location of the at least one artifact that is part of the application according to the same application blueprint and to the mapping of logical artifact names to resource locations of repositories associated with the second deployment environment; and
deploying the second build of the application in the second environment from the determined second resource location of the least one artifact.

9. The non-transitory computer-readable storage medium of claim 7, wherein the first build of the application is deployed from a first repository of a first repository type, the first repository associated with the first deployment environment; and wherein the second build of the application is deployed from a second repository of a second repository type associated with the second deployment environment.

10. The non-transitory computer-readable storage medium of claim 7, wherein the mapping of logical artifact names to resource locations of repositories is generated according to a process comprising:
generating a specification for a first type of repository configured to store artifacts; and
generating an instance of the specification associated with the first deployment environment having the first type of repository, wherein the first deployment environment is associated with a stage within a release pipeline.

11. The non-transitory computer-readable storage medium of claim 10, wherein the specification comprises a first field indicating a type of version, a second field indicating how the first type of repository is accessed, and a third field indicating an action parameter used to access the first type of repository.

12. The non-transitory computer-readable storage medium of claim 7, wherein the first deployment environment is part of a series of deployment environments representing a release pipeline comprising at least a test environment and a production environment.

13. A computer system, comprising:
a storage device comprising one or more repositories configured to store build artifacts;
a processor configured to perform steps for managing artifacts of an application deployment, the steps comprising:
receiving a request to deploy an application defined by an application blueprint in a first deployment environment, wherein the application blueprint specifies a logical artifact name of at least one artifact that is part of the application;
determining a resource location of the at least one artifact that is part of the application according to the application blueprint and to a mapping of logical artifact names to resource locations of repositories associated with the first deployment environment; and deploying a first build of the application in the first deployment environment from the determined resource location of the at least one artifact; and responsive to determining the first build of the application in the first deployment environment has passed testing, promoting the at least one artifact to a second deployment environment and deploying a second build of the application in the second deployment environment associated with a next stage within a release pipeline.

14. The computer system of claim 13, wherein the processor is further configured to perform the steps comprising:

determining a second resource location of the at least one artifact that is part of the application according to the same application blueprint and to the mapping of logical artifact names to resource locations of repositories associated with the second deployment environment; and deploying the second build of the application in the second environment from the determined second resource location of the least one artifact.

15. The computer system of claim 13, wherein the first build of the application is deployed from a first repository of a first repository type, the first repository associated with the first deployment environment; and wherein the second build of the application is deployed from a second repository of a second repository type associated with the second deployment environment.

16. The computer system of claim 13, wherein the mapping of logical artifact names to resource locations of repositories is generated according to a process comprising:

generating a specification for a first type of repository configured to store artifacts; and generating an instance of the specification associated with the first deployment environment having the first type of repository, wherein the first deployment environment is associated with a stage within a release pipeline.

17. The computer system of claim 13, wherein the first deployment environment is part of a series of deployment environments representing a release pipeline comprising at least a test environment and a production environment.

* * * * *